United States Patent [19]

Andersen

[11] 4,051,868

[45] Oct. 4, 1977

[54] CONTROL DEVICE FOR A HYDRAULICALLY OPERATED CONSUMER

[75] Inventor: Hans Skov Andersen, Augustenborg, Denmark

[73] Assignee: Danfoss A/S, Nordborg, Denmark

[21] Appl. No.: 669,671

[22] Filed: Mar. 23, 1976

[30] Foreign Application Priority Data

Apr. 3, 1975 Germany ............................ 2514624

[51] Int. Cl.[2] ............................................ F16K 11/00

[52] U.S. Cl. ............................... 137/596.13; 137/117; 91/412; 91/446

[58] Field of Search .............. 137/117, 596.13, 596.12, 137/625.69, 557; 91/412, 446

[56] References Cited

U.S. PATENT DOCUMENTS

| | | | |
|---|---|---|---|
| 3,693,506 | 9/1972 | McMillen et al. | 91/412 |
| 3,742,980 | 7/1973 | Byers, Jr. | 137/625.69 |
| 3,744,517 | 7/1973 | Budzich | 137/596.2 |
| 3,750,690 | 8/1973 | Bubula et al. | 137/625.69 |
| 3,807,447 | 4/1974 | Masuda | 137/596.13 |
| 3,882,896 | 5/1975 | Budzich | 91/446 |
| 3,976,097 | 8/1976 | Brakel | 91/446 |
| 3,984,979 | 10/1976 | Budzich | 91/446 |
| 3,989,062 | 11/1976 | Tennis | 137/596.13 |
| 3,998,134 | 12/1976 | Budzich | 137/596.13 |

FOREIGN PATENT DOCUMENTS

| | | | |
|---|---|---|---|
| 1,227,749 | 6/1959 | France | 137/596.12 |

*Primary Examiner*—William R. Cline
*Assistant Examiner*—H. Jay Spiegel

[57] ABSTRACT

The invention relates to a hydraulic control valve assembly, or a plurality of control valve assemblies, for controlling one or more consumer units such as hydraulic motors. Each valve assembly has conventional supply and exhaust ports for selectively and alternately pressuring and exhausting two ports to which a consumer unit is connected. Each valve assembly has pressure sensing control ports which sense pressure in the consumer unit ports. Conduit means connected to the control ports include a pressure differential regulator which shunts the supply pressure and which reacts to pressure supplied to the consumer unit to control the regulator. In a preferred embodiment comprising a plurality of control valve assemblies and associated consumers and a common pressure differential regulator, the individual sensing conduits of all control units are connectable at one end to the return conduit in the neutral position and are combined at the other end to form a collecting sensing conduit. The collecting sensing conduit is connected to the return conduit by a relief line which is open at least in the neutral position of the control slide. Each individual sensing unit contains a check valve which closes when the pressure in the collecting sensing conduit exceeds the pressure in the individual sensing conduit. The pressure in the supply conduit is thereby set so that the consumer unit with the highest load will still receive an adequate pressure.

5 Claims, 7 Drawing Figures

CONTROL DEVICE FOR A HYDRAULICALLY OPERATED CONSUMER

The invention relates to a control device for a hydraulically-operated consumer which, on the inlet side, is suppliable with pressure fluid by a source of pressure medium, e.g. a pump, through a supply conduit, a control unit and a service main of the inlet side and, on the outlet side, is connectible to a tank through a service main of the outlet side, the control unit and a return conduit, wherein the housing of the control unit contains control apertures associated with the supply conduit, the service mains and the return conduit, which apertures are connectible in pairs in the operative position by means of a control slide which blocks the supply in the neutral position, wherein the supply conduit is associated with a pressure differential regulator which is influenced by the pressure in the supply conduit and in the opposite direction by a spring and by the pressure in a sensing conduit connected to the service main of the inlet side, and wherein the control slide and housing form two switching valves of which one connects the sensing conduit to the return conduit in the neutral position and the other connects the sensing conduit to the service main of the inlet side in the operative position and blocks this position in the respective other position.

In a known control device of this kind, two control slides for two different consumers are associated with a common pressure differential valve which is disposed in a branch line between the supply conduit and return conduit and, by appropriate throttling, ensures that the pressure fluid is supplied at a uniform pressure regardless of the consumer load. The control unit has a housing bore in which, substantially symmetrical to an annular groove connected to the supply conduit, there are two annular grooves which are each connected to a service main and two annular grooves each connected to a return conduit. The control slide is of piston shape and, symmetrically to a collar which covers the annular supply conduit groove in the neutral position, comprises two annular connecting grooves for the selective connection of the two annular service main grooves to the annular supply conduit groove or the adjacent annular return conduit groove. Between the annular supply conduit groove and each of the two annular service main grooves, a sensing conduit hole opens into the bore of the housing, which hole is connected to the sensing conduit. If the control slide is displaced from the neutral position, the sensing conduit is first connected to a service main and only then is this service main connected to the supply conduit. Further, each control slide has a transverse hole which co-operates with corresponding return conduit holes in the housing and, when all the control slides are in the neutral position, connects the sensing conduit and hence the associated pressure chamber of the pressure differential valve to the tank.

In this control device it is difficult accurately to align the transverse hole in the control slides and the associated return conduit holes with respect to one another, especially if a plurality of such holes have to be juxtaposed in the case of a plurality of control units. It was not possible to make the holes larger because otherwise an excessively large dead zone would result. This is because the transverse hole leading to the tank should be closed before the sensing conduit hole to be connected to the service main is opened. An additional problem is that in the case of a plurality of consumers operating at different loads the pressure existing in the sensing conduit is not definite but rather a mixed value comprised of the different service main pressures. Even if the control slides are not actuated simultaneously, each consumer can be operated only with the same pressure.

It is also already known to design such a control device so that from each control unit there extend two individual sensing conduits which are each connectible to a service main, each comprise a pressure reduction valve with adjustable pressure drop and are combined to form a collecting sensing conduit which on the one side leads to the corresponding pressure chamber of the pressure differential valve and on the other side is connected to the return conduit by way of a constant current shunt valve. The pressure reduction valves reduce the service main pressure effective in the pressure differential valve, so that different pressures can be associated with the individual consumers. In addition, the pressure reduction valves serve as check valves which ensure that the service main having the highest pressure is effective in the collecting sensing conduit. The principal disadvantage in this case is that these pressure reduction valves do not return to the closing position at all or do not return sufficiently rapidly when the control slide having the as yet highest consumer pressure has been brought to the neutral position.

A control device is also known in which the sensing conduits extend from two annular grooves diposed near the ends of the bore of the housing. A transverse hole in the control slide co-operating therewith communicates with a respective one of the annular service main grooves by way of passages which also extend in the slide. A switching valve dependent on the pressure in the sensing conduit connects the spring-containing pressure chamber of the pressure differential valve to the sensing conduit in the one position and to the return conduit in the other position. This switching valve is an additional structural component. It can, when the associated control slide is moved to the neutral position, follow this movement only with the delay that is inherent in the system. Nor does it assist defined regulation when there are a plurality of consumers.

The invention is based on the object of providing a control device of the aforementioned kind in which the sensing conduit is connectible to the return conduit with sufficiently large cross-sections without any time delay and in a constructionally simple manner and so the the prerequisites for trouble-free operation also obtain in the case of several independent consumers.

This object is achieved according to the invention in that the housing of the control unit is provided with two interconnected control apertures associated with the sensing conduit, of which one is disposed on the one side of a return conduit control aperture and the other is disposed on the opposite side of a return conduit control aperture, and that the control slide comprises two first sensing conduit valve apertures which, in the neutral position, connect the two sensing conduit control apertures to the associated return conduit control aperture.

In this construction, the valve connecting the sensing conduit to the return conduit in the neutral position is provided directly on the control slide in the form of a double valve. No time delays therefore occur. Since each sensing conduit control aperture co-operates with the associated return control aperture merely by way of an edge, the said apertures can have a cross-section as large as desired. It is also particularly favourable that one can use as return conduit control apertures the return conduit control apertures that are in any case provided in the control unit for the outflow of pressure medium from the consumer.

It is particularly favourable if the control slide comprises two second sensing conduit valve apertures which are each connected by way of passages in the control slide to a service main control aperture and are connectible in the operative position to a sensing conduit control aperture in the housing of the control unit. With the aid of the passages in the control slide, one can displace the second sensing conduit valve apertures to the vicinity of the first sensing conduit valve apertures and in this way achieve further simplifications, in particular short sensing conduit connecting sections.

In particular, the first and second sensing conduit valve apertures may be juxtaposed in the control slide and co-operate with a common sensing conduit control aperture in the housing.

In a control device with a housing bore in which, substantially symmetrical to an annular supply groove, two annular service main grooves and two annular return conduit grooves are provided, and comprising a piston-shaped control slide having, substantially symmetrical to a collar, two annular connecting grooves for selectively connecting the two annular service grooves to the annular supply groove or the adjacent annular return conduit groove, it is preferred that in the bore of the housing on each side externally of the annular return conduit grooves a respective annular groove should form the sensing conduit aperture and at the control slide on each side externally of the annular connecting grooves two annular grooves should from the first and second sensing conduit valve apertures. Since the connection takes place by way of the control edges of the annular groove boundaries, a very small dead zone is produced and a very large cross-section is opened suddenly.

In a control device comprising a housing bore in which, substantially symmetrical to an annular supply groove, two annular service main grooves and two annular return conduit grooves are provided, and comprising a substantially symmetrically constructed piston-shaped control slide, however, it should be ensured that in the bore of the housing on each side externally of the annular return grooves two interconnected annular grooves should form the sensing conduit control apertures and at the control slide on each side externally of three annular connecting grooves for the selective connection of the two annular service grooves to the annular supply groove or the adjacent annular return groove two annular grooves should form the first and second sensing conduit valve apertures.

In a preferred embodiment comprising a plurality of control units and associated consumers and a common pressure differential regulator, it is favourable if the individual sensing conduits of all control units are connectible at one end to the return conduit in the neutral position and are combined at the other end to form a collecting sensing conduit and if the collecting sensing conduit is connectible to the return conduit by a relief line which is open at least in the neutral position of the control slide, and if each individual sensing unit contains a check valve which closes when the pressure in the collecting sensing conduit exceeds the pressure in the individual sensing conduit. In this circuit, always the highest service main pressure will obtain in the collecting sensing conduit. The presssure in the supply conduit is therefore clearly so set that the consumer with the highest load will still receive an adequate pressure. However, as soon as the associated control slide is returned to the neutral position, the side of the associated stop valve remote from the collecting sensing conduit is applied without delay and with an adequately large cross-section to the return conduit so that the stop valve moves to the closing position as rapidly as possible and is also securely retained in the closing position if the pressure from a different service main obtains in the collecting sensing conduit.

In the simplest case, a permanently open throttle can be provided in the relief line.

If one wants to avoid the leakage losses caused thereby, the relief line may contain a series circuit of switching valves of which one is associated with each control unit and which close when the pressure in the individual sensing conduit rises above the return pressure. As soon as a consumer is taken into operation, the collecting sensing conduit is automatically separated from the return conduit.

One may also select a shorter relief line or let part of the collecting sensing conduit to assume the function of the relief line if the relief line contains a switching valve which is associated with a first control unit and closes when the pressure in the associated first individual sensing conduit rises above the return pressure and if the collecting sensing conduit contains a further switching valve which is disposed between the connections of the individual sensing conduits of every two control units and which closes when the pressure in the respective individual sensing conduit rises above the pressure in the proceeding section of the collecting sensing conduit.

In a particularly advantageous circuit, the stop valve is combined with the switching valve of the same control unit to form a reversing valve which connects the following section of the collecting sensing conduit either to the preceding section of the collecting sensing conduit or the relief line or to the associated individual sensing conduit and blocks the respective other connection. By combining the valve functions one obtains a very simple construction.

If, in addition, the pressure of a plurality of consumers should be settable independently of one another, it is recommended that the supply conduit of each control unit should contain a pressure setting valve which is influenced in the closing direction by the pressure in the supply conduit control aperture and in the opening direction by an adjustable spring and the pressure in the associated individual sensing conduit in front of the check valve. In this way it is possible to relieve the individual sensing conduit from any pressure reduction function, so that all the stop valves will behave the same during closing. Conversely, by means of the pressure setting valve in the supply conduit the pressure drop in the control unit on the inlet side is held constant to a settable value. The common pressure differential valve therefore ensures that the source of pressure medium provides the pressure just required for the most heavily loaded consumer whilst the pressure setting valves in the individual supply conduits adapt the pressure for the individual consumers.

Examples of the invention will now be described in more detail with reference to the drawing, wherein.

Figure 1:
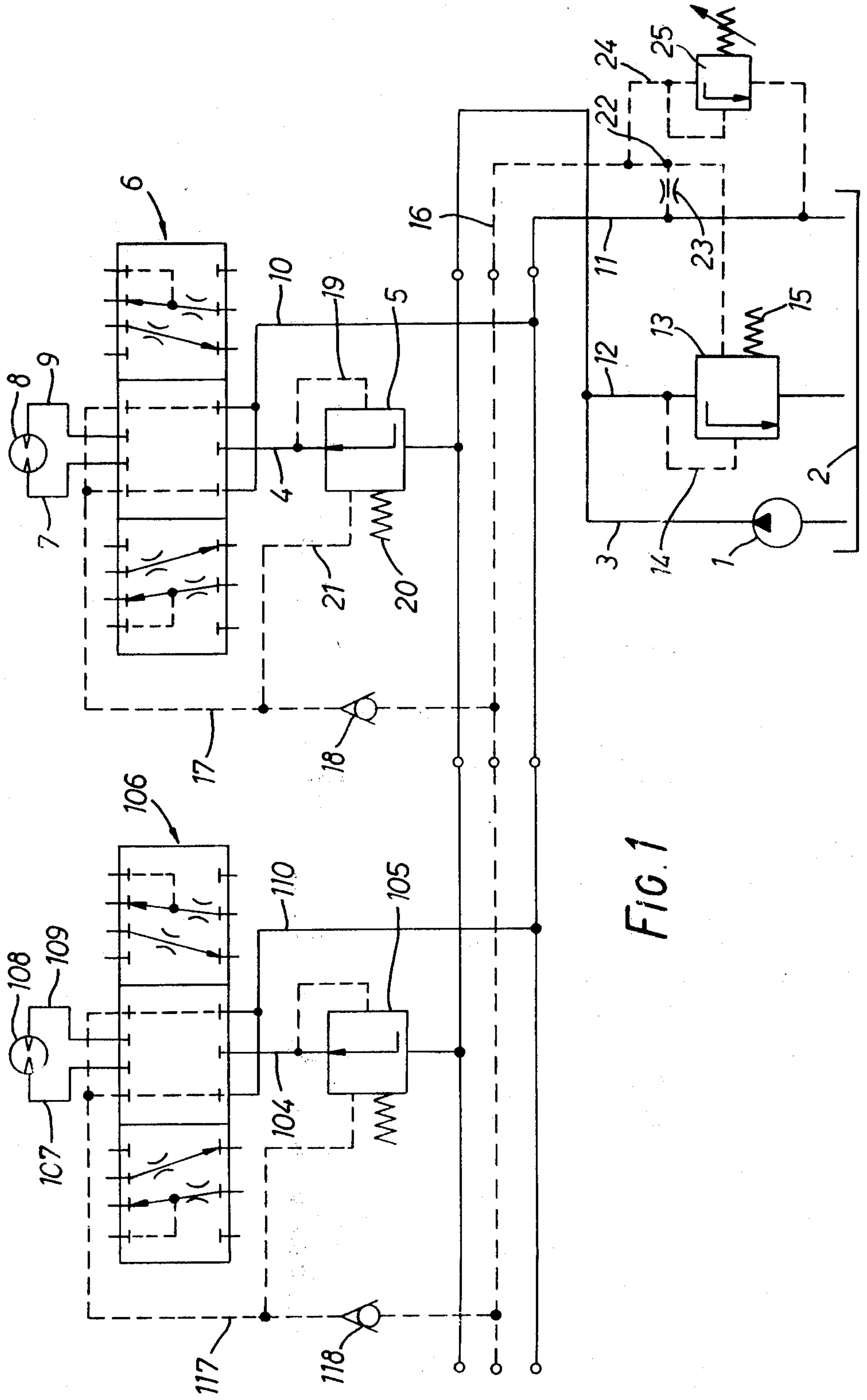
FIG. 1 is a sketch showing the principle of a control device according to the invention.

In the control device according to FIG. 1, a pump 1 sucks liquid from a tank 2 and conveys it through a collecting conduit 3 and an individual supply conduit 4, in which there is a pressure setting valve 5, a control unit 6 and a service main 7 of the inlet side to a consumer 8 that is here illustrated as a rotary motor. The return flow takes place through a service main 9 of the outlet side, the control unit 6, an individual return conduit 10 and a collecting return conduit 11 to the tank 2. A further consumer 108 is connected to the collecting conduit 3 and the collecting return conduit 11. The corresponding integers, for example the associated control unit 106, are referenced with numerals that are increased by 100. Similarly, further consumers may be connected in parallel.

Between the collecting supply conduit 3 and the tank 2 there is a shunt conduit 12 containing a pressure differential valve 13. The latter is influenced in the opening direction by pressure in the collecting supply conduit 3 through a conduit 14 and in the closing direction by an adjustable spring 15 and the pressure in a collecting sensing conduit 16. Several individual sensing conduits 17 or 117 which open into the collecting sensing conduit 16 each contain a stop valve 18, 118 in the form of a simple check valve. At the end remote from the collecting sensing conduit 16, the individual sensing conduit 17 is connected in the control unit 6 in the illustrated neutral position to the return conduit 10 and in the operative positions to the respective service main 7 or 9 of the inlet side. Consequently, so much pressure fluid is diverted into the tank by way of the pressure differential valve 13 that the pressure in the collecting supply conduit 3 lies above the pressure existing in the service main of the inlet side by an amount corresponding to the spring setting 15.

The pressure setting valve 5 is influenced in the closing direction through a conduit 19 by the pressure behind the valve and in the opening direction by an adjustable spring 20 and through a conduit 21 by the pressure in the individual sensing conduit 17. This valve therefore holds the pressure drop in the control unit 6 on the inlet side to a constant value predetermined by the spring 20.

An outlet conduit 22 with a fixed throttle 23 is provided between the collecting sensing conduit 16 and the return conduit 11. This permits the pressure in the collecting sensing conduit 16 to be reduced to the tank pressure in the neutral position of the control units.

If it is now assumed that both consumers 8 and 108 are operated simultaneously but the consumer 8 with a higher load, then the stop valve 18 opens. The higher pressure now existing in the collecting sensing conduit 16 holds the stop valve 118 closed. The pressure differential valve 13 is controlled in dependence on the higher pressure in the service main of the inlet side of the consumer 8. If, now, the consumer 8 is made inoperative by leading the control unit to the neutral position, the end of the individual sensing conduit 17 opposite the collecting sensing conduit 16 immediately receives the tank pressure by reason of the connection to the return conduit 10. The stop valve 18 therefore closes under the influence of the pressure still existing in the collecting sensing conduit 16. Since this pressure is reduced by the throttle 23, the stop valve 118 can subsequently open under the influence of the load pressure of the consumer 108, so that this pressure now takes over the control of the differential pressure valve 13. The outlet conduit 22 is also bridged by a further conduit 24 in which there is an excess pressure valve 25 which opens if the pressure in the collecting sensing conduit 16 becomes too large.

Figure 2:
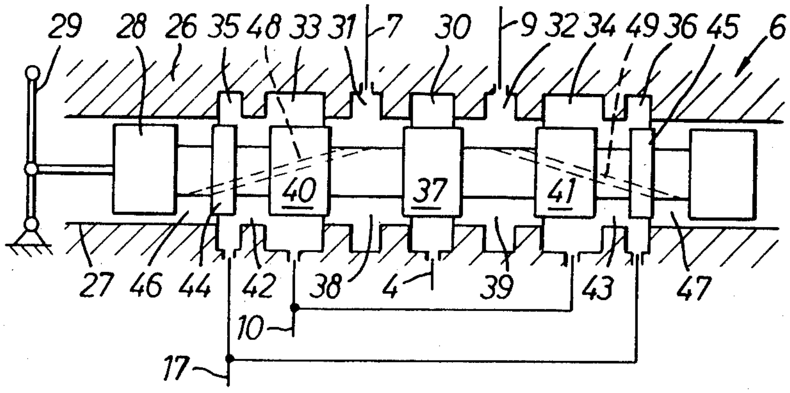
FIG. 2 is a diagrammatic longitudinal section through a control unit.

One embodiment of a control unit 6 is diagrammatically illustrated in longitudinal section in FIG. 2. In a housing 26 a bore 27 is provided in which a piston-shaped control slide 28 is displaceable by an actuating element 29 from a central neutral position to one of two operative positions. Numerous control apertures are provided in the bore and a plurality of connecting and valve apertures in the form of annular grooves in the control slide. Symmetrically to an annular supply groove 30, the bore 27 possesses two annular service main grooves 31 and 32, two annular return conduit grooves 33 and 34 and two annular sensing conduit grooves 35 and 36. At the control slide there is a central collar 37 which blocks the annular supply conduit groove 30 in the neutral position. At each of both sides there is an annular connecting groove 38 and 39 which serve for the connection of the annular service grooves 31 and 32 to the annular supply conduit groove 30 or one of the annular return conduit grooves 33 and 34. Inlet throttling occurs between the edges of the collar 37 and the annular supply conduit groove 30 and outlet throttling between the edges of further collars 40 and 41 as well as the annular return grooves 33. At both sides on the outside there are first sensing conduit-valve aperture annular grooves 42 and 43 which produce a connection between the annular sensing conduit grooves 35 and 36 in the housing in the neutral position. Beyond collars 44 and 45 there are on both sides second sensing conduit-valve aperture annular grooves 46 and 47. On the one side these are connected through passages 48 and 49 to the annular grooves 38 and 39 and thus to the annular service main grooves 31 and 32. On the other side, they communicate with one of the annular sensing conduit grooves 35 and 36 in the operative position. The collars 44 and 45 are so dimensioned that they are only slightly wider than the annular sensing conduit grooves 35 and 36. Consequently there is an extremely small dead zone between the instant of separating the sensing conduit 17 from the return conduit 10 and connecting it to one of the service mains 7 or 9. Since the connection in each case takes place over the entire peripheral edge of the collars 44 and 45, an adequately large cross-sectional area for obtaining rapid pressure balance is already available with a small overlap of the annular grooves.

If the control slide 28 is moved out of the neutral position towards the right by means of the actuating element 29, the supply conduit 4 is connected through the annular grooves 30, 38 and 31 to the service main 7 and the service main 9 is connected through the annular grooves 32, 39 and 34 to the return conduit 10. The further the displacement of the control slide, the larger will be the throughflow apertures and the smaller will be the throttling resistance. Even after a small amount of displacement from the neutral position, the annular sensing conduit grooves 35 and 36 are separated from the return conduit 10 and the sensing conduit 17 is connected to the service main 7 of the inlet side through the annular grooves 31 and 38, the passage 48, and the annular grooves 46 and 35. Upon displacement of the control slide 28 towards the left, the supply takes place through the service main 9 and the return flow through the service main 7.

Figure 3:
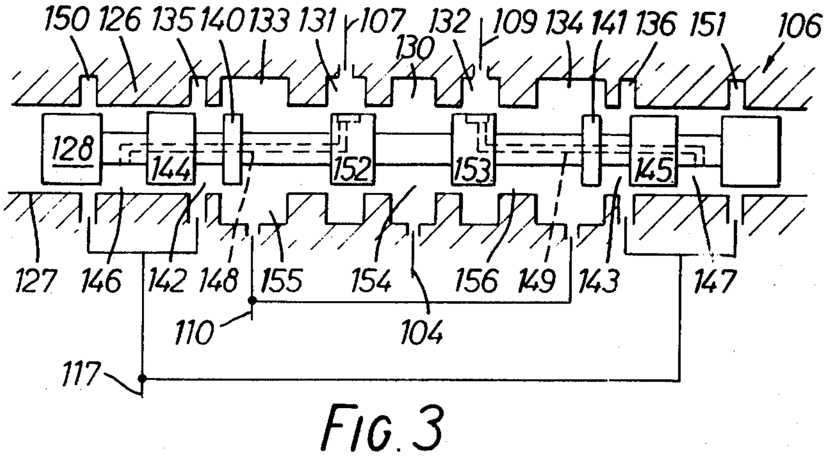
FIG. 3 is a diagrammatic longitudinal section through a modified control unit.

In the FIG. 3 embodiment, which might show the control unit 106, reference numeral increased by 100 are used for comparable integers. The principal difference from FIG. 2 is that the two outer ends of the bore 127 are provided with two second annular sensing conduit grooves 150, 151 which are connected to the annular sensing conduit grooves 135 and 136 and thus to the individual sensing conduit 117. The control slide 128 has in its central region three annular connecting grooves 154, 155 and 156 which are separated by collars 152 and 153 and connect the service mains 107 or 109 to the supply conduit 104 or the return conduit 110.

In the neutral position, both service mains 107 and 109 are in communication with the return conduit 110 through the annular grooves 131, 155, 133 or 132, 156, 134 and the individual supply line 117 is connected to the return conduit 110 through the annular grooves 135, 132, 133 or 136, 143, 134, so that tank pressure obtains everywhere in the return conduit 110. Upon displacement of the control slide 128 to the right, the supply conduit 104 is connected by the annular grooves 130, 154, 132 to the service main 109 whilst the connection of the service main 107 to the return conduit 110 is maintained. At the same time the annular sensing conduit groove 135 is separated from the return conduit 110 and the sensing conduit-valve aperture-annular groove 147 is brought into communication with the annular sensing conduit groove 151. As a result, the pressure of the service main 109 of the inlet side obtains in the sensing conduit 117. Upon displacement towards the left, the reverse conditions obtain. Functionally, this embodiment therefore differs from that of FIG. 2 only in that the service mains are connected to the return conduit in the neutral position and that for the purpose of achieving the same manner of operation of the consumer the slide must be displaced in the opposite direction.

Figure 4:
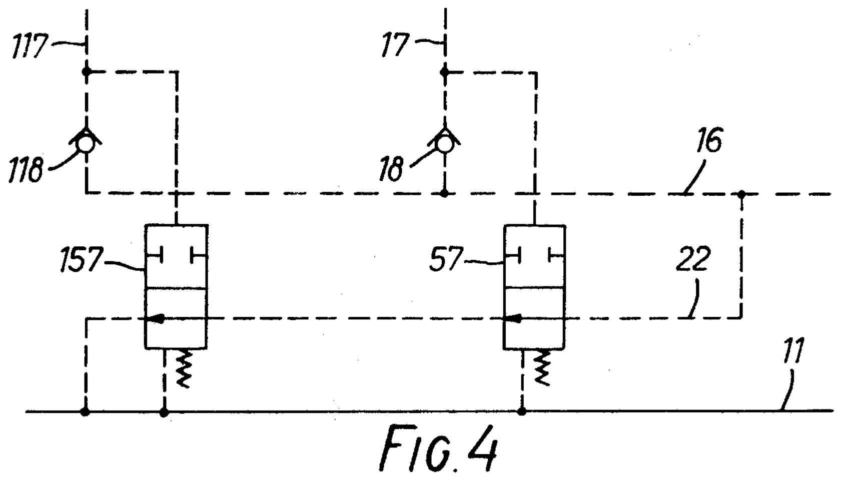
FIG. 4 is another circuit for the collecting sensing conduit and withdrawal conduit.

FIG. 4 shows that the individual supply conduit 17, 117 is connected to the collecting sensing conduit 16 as in FIG. 1 but the outlet conduit 22 has a somewhat different construction. Here, switching valves 57, 157 are shown in series in the outlet conduit 22, which valves create a short circuit in the illustrated rest position between the collecting sensing conduit 16 and the return conduit 11. The switching valves are subjected to the pressure of the individual sensing conduit 17, 117 in the closing direction and, in the opening direction, under the pressure of the return conduit 11 and possibly the force of a spring if gravity has to be overcome. Thus, as soon as a control slide is displaced from the neutral position in a control unit and the pressure of the service main on the inlet side is passed through the associated individual sensing conduit 17, the associated switching valve separates the collecting sensing conduit 16 from the return conduit 11 so that the full sensing conduit pressure can be effective in the pressure differential valve 13. As soon as the control slide has been returned to the neutral position, tank pressure obtains in the individual sensing conduit 17 because of its connection to the individual return conduit 10, whereupon the switching valve 57 returns to the open position and the collecting sensing conduit 16 is relieved.

Figure 5:
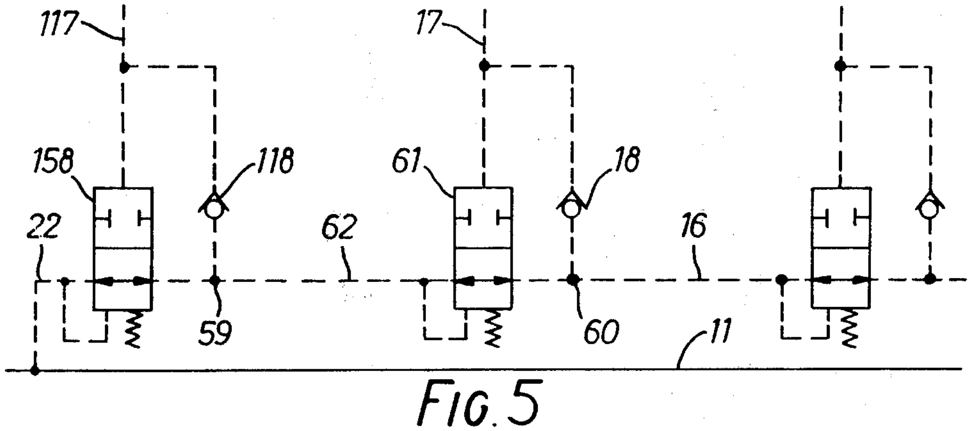
FIG. 5 is an alternative solution to that of FIG. 4.

In the embodiment of FIG. 5, the circuit is somewhat different. Here, there is only one switching valve 158 in the outlet conduit 22. It is subjected on the one side to the influence of the pressure in the individual sensing conduit 117 and on the other side to the influence of the pressure in the return conduit 11 and possibly a spring. Between the connecting point 59 of the individual sensing conduit 117 and the connecting point 60 of an individual sensing conduit 17, the collecting sensing circuit 16 contains a further switching valve 61 which is on the one side under the influence of the pressure in the individual sensing conduit 17 and on the other side under the influence of the pressure in the preceding section 62 of the collecting sensing conduit 16 and a spring. The same provisions can be made for connecting further control units as is indicated in FIG. 5. If the individual sensing conduit 117 is under pressure, the switching valve 158 moves to the closed position and the pressure from the individual sensing conduit 117 is passed on through the collecting sensing conduit 16. If, now, the individual sensing conduit 17 receives a higher pressure then the switching valve 61 closes and this higher pressure is transmitted to the collecting sensing conduit 16 through the check valve 18. On the other hand, if the pressure in the individual sensing conduit is less than that in the individual sensing conduit 117, the switching valve 61 remains open because the pressure in the section 62 is predominant and the stop valve 18 remains closed. In every case, therefore, the higher pressure is transmitted to the pressure differential valve 13. If the tank pressure obtains again in all the individual sensing conduits 17, 117, the valves return to their illustrated rest position.

Figure 6:
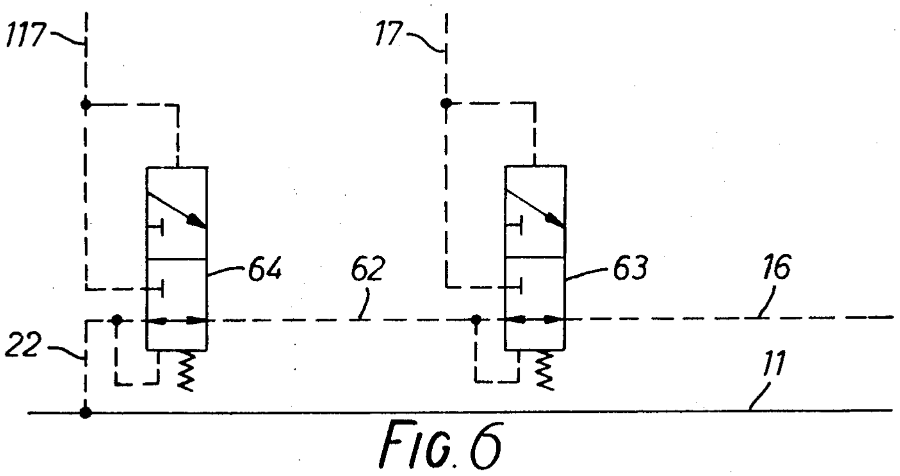
FIG. 6 is a further alternative to that of FIG. 4.

In the embodiment according to FIG. 6, the stop valves are combined with the respective switching valves of FIG. 5 to form a reversing valve 63 or 64. The next following section of the collecting sensing conduit 16 is, in the rest position of these reversing valves, connected to the preceding section 62 or the outlet conduit 22 and, in the operative position, to the individual sensing conduit 17 or 117. The manner of operation corresponds to that of FIG. 5.

Figure 7:
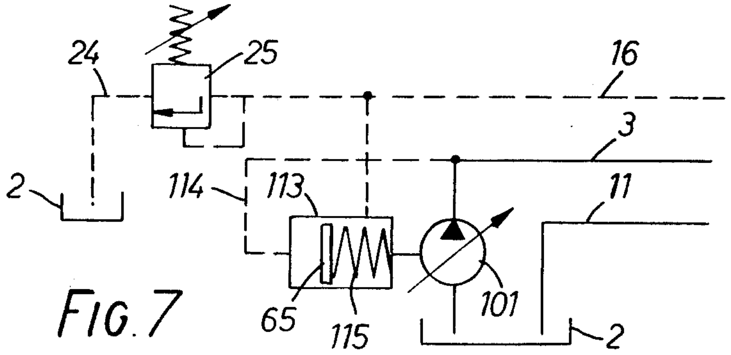
FIg. 7 is another embodiment of the source of pressure medium.

FIG. 7 shows a pump 101 with a variable volume that is adjusted by a pressure differential regulator 113. The latter has a servo element in the form of a piston 65 which on the one side is subjected to the pressure of the supply conduit 3 passed through the conduit 114 and on the other side to the pressure of the collecting sensing conduit 16 and a spring 115. In this arrangement there is a very considerable saving in energy because the pump 101 can always be set to zero output when all the control units are in the neutral position.

The pressure differential regulator can also be in the form of a straightway valve in the supply conduit 3, which valve is influenced on the one side by the pressure behind this valve and on the other side by a spring and the pressure in the collecting sensing conduit 16.

I claim:

1. A pressurized fluid distribution system comprising a plurality of control valve units, each of said units being for a hydraulically operated consumer unit and comprising a housing having a cylindrical bore, a spool type slide member slidably disposed in said bore, a plurality of operational ports in said housing opening into said bore, one of said ports being a supply port, two of said operational ports being first and second consumer unit ports on opposite sides of said supply port, two of said operational ports being return ports positioned outwardly from said supply port, two of said operational ports being first and second pressure sensing ports positioned outwardly from said return ports, conduit means in said housing connecting said first and second pressure sensing ports, said slide member having spools arranged to place said pressure sensing ports in fluid communication with said return ports when said slide member is in a neutral position, said spools being arranged to selectively pressurize either one of said consumer unit ports while exhausting the other one of said consumer unit ports, and said spools arranged to place said first pressure sensing port in fluid communication with said first consumer port when it is being pressurized and place said second pressure sensing port in fluid communication with said second consumer port when it is being pressurized, a common supply line connected to said supply ports of said units, a common collecting sensing conduit connected to said pressure sensing ports of said units, a common return line connected to said return ports of said units, said control valve units being connected by said common supply line and said common collecting sensing conduit to a common differential pressure regulator, pressure relieving means to totally relieve the pressure in said common collecting sensing conduit when all of said control valve units are in their neutral operating states, and individual check valve means between said common collecting sensing conduit and the respective ones of said control ports of said control valve units to set the pressure in said common supply line so that the consumer unit with the highest load connected to any one of said control valve units receives an adequate predetermined pressure.

2. A pressurized fluid distribution system according to claim 1 wherein two control conduits formed in said slide member are dead ended when said slide member is in a neutral position, one of said control conduits providing fluid communication between said supply port and one of said pressure sensing ports when said slide member is moved to one nonneutral position and the other of said control conduits providing fluid communication between said supply port and the other of said pressure sensing ports when said slide member is moved to the opposite nonneutral position.

3. A pressurized fluid distribution system according to claim 1 wherein two of said operational ports in each of said control valve units form a second pair of pressure sensing control ports positioned outwardly from said first named pair of contro ports, and conduit means in each said housing respectively connecting the outer ones of said pressure sensing ports to the adjacent inner ones of said pressure sensing ports.

4. A pressurized fluid distribution system as set forth in claim 1 wherein said pressure relieving means is a throttle valve having a fixed opening.

5. A pressurized fluid distribution system according to claim 1 wherein said pressure relieving means comprises a plurality of switching valves in a series circuit respectively connected to said pressure sensing ports of said control valve units which close individually when the pressure in the individual ones of said pressure sensing ports rises above the pressure in said common return line.

* * * * *